UNITED STATES PATENT OFFICE.

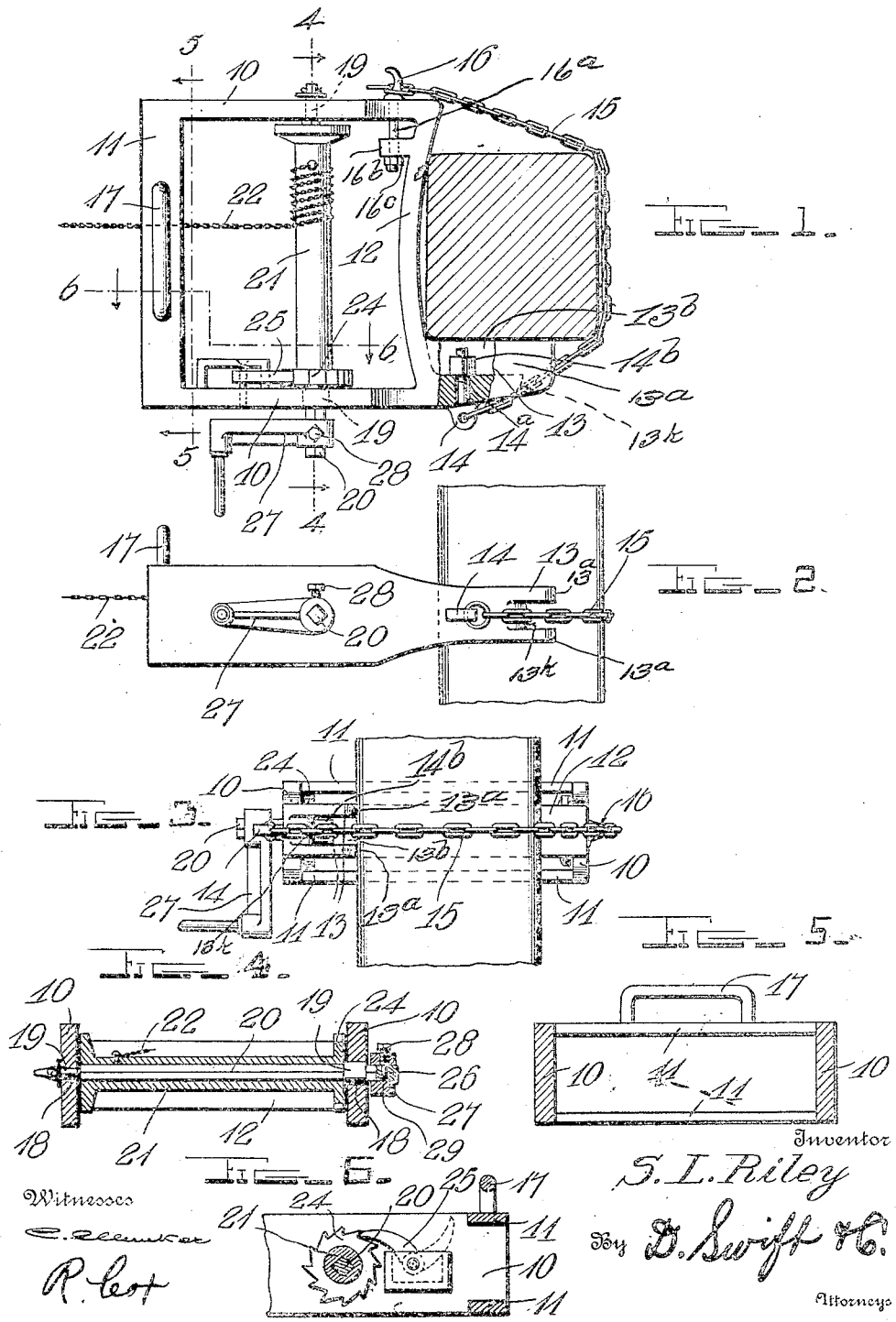

SAMUEL L. RILEY, OF PALESTINE, TEXAS, ASSIGNOR OF ONE-FOURTH TO SARAH A. GRIGGS AND ONE-FOURTH TO MARTHA BRYANT.

WIRE-STRETCHER.

1,056,303.   Specification of Letters Patent.   Patented Mar. 18, 1913.

Application filed December 6, 1910. Serial No. 595,972.

*To all whom it may concern:*

Be it known that I, SAMUEL L. RILEY, a citizen of the United States, residing at Palestine, in the county of Anderson and State of Texas, have invented a new and useful Wire-Stretcher; and I do hereby declare the following to be a full, clear, and exact description of the invention, such as will enable others skilled in the art to which it appertains to make and use the same.

It is the object of the present invention to provide an improved wire stretcher.

One aim of the invention is to provide a stretcher so constructed that it may be readily adjusted against a post, to which the wire is to be secured, by being held in one hand, the other hand being employed in rotating the drum upon which the wire is to be wound. By so constructing the device, the operator is enabled to properly adjust the same against the post while he is winding up the slack wire which must be taken in before the stretching operation is commenced.

A further aim of the invention is to so construct the stretcher that it may be readily operated when near the lower end of the post, or in other words is positioned near the ground.

In the accompanying drawings:—Figure 1 is a top plan view of the stretcher. Fig. 2 is a detail side elevation thereof. Fig. 3 is a rear elevation. Fig. 4 is a vertical sectional view on the line 4—4 of Fig. 1. Fig. 5 is a similar view on the line 5—5 of Fig. 1. Fig. 6 is a similar view on the line 6—6 of Fig. 1.

The frame of the stretcher embodying the present invention is preferably a cast frame and includes sides 10 which are connected at their front ends by spaced bars 11, between which the wire to be stretched, passes. At their rear ends, the sides 10 are connected by a cross piece 12, which is preferably concaved in its rear side whereby to adapt the frame for disposal against a square or a round post. At one of its rear corners the frame is formed with a rearwardly projecting arm 13 provided with an apertured ear 14 to which is permanently connected one end of a chain 15. This arm 13 is provided with flanges 13$^a$, which engage the side face of a fence post, as shown clearly in Fig. 1. Between the flanges a pocket 13$^b$ is formed, in which the nut 14$^b$ (which is threaded upon a threaded shank 14$^a$ of the detachable ear 14) is arranged. By virtue of the flanges the nut 14$^b$ is held apart from the fence post. The flanges not only hold the nut spaced apart from the post but also act as protecting means for the nut. In other words, the flanges act to prevent the nut from being unscrewed. The shank 14$^a$ of the ear penetrates the arm 13, as shown in Fig. 1. The chain is designed to be passed about any post to which the wire to be stretched is to be secured and after being so disposed, it has one or another of its links engaged with a hooked finger 16 at the opposite corner of the frame. The chain when so disposed also engages a recess 13$^k$ of the arm. The finger 16 is provided with a shank 16$^a$ having threads. This shank extends through the frame and through a lug 16$^b$, and is provided with a nut 16$^c$. This construction renders the finger detachable. In order that the frame may be supported by one hand while being adjusted to the post, a handle 17 is provided upon the upper one of the bars 11. The advantage of this handle 17 and the function of the arm 13 will be presently made clear in connection with the description of operation.

The sides of the frame are formed with alined openings 18 in which are rotatably fitted the rounded ends 19 of a shaft 20 which, between its ends, is squared. A winding drum 21 is fitted upon the shaft 20 for rotation therewith and to this shaft is secured one end of a chain 22 carrying at its other end a wire gripping device of any suitable form. This gripping device is intended to grip the wire to be stretched and in order to prevent backward rotation of the drum, it is formed at one end with a toothed head 24 with which coöperates a pawl 25. At one end the shaft is formed with an opening 26, and this end of the shaft is squared for the engagement thereon of a crank handle by means of which it may be rotated. This crank handle is indicated by the numeral 27 and is of the ordinary form, it being secured in place by means of a bolt 28 having a threaded portion fitting into the head of the handle and an unthreaded, reduced portion 29 fitting into the opening in the said end of the shaft. This opening is left unthreaded so that when the device is positioned near the ground, a bar may be inserted therein and the shaft rotated step by step.

From the foregoing description of the invention it will be readily understood that by rotating the shaft 20, the wire gripped by the device will be drawn toward the post to which the device is applied. In using the stretcher, the frame is disposed against the post in the position illustrated in the figures of the drawings, it being gripped by the handle 17 and so held that the arm 13 will rest against the post. The frame may then be moved up or down upon the post or may be swung around the post in either direction, should the post be a corner post. While being thus positioned, the crank handle is being turned by the operator to wind the slack wire upon the drum 21. After the frame has been properly positioned the stretching operation is begun in the usual manner. It will now be understood that not only does the arm 13 perform the function of a guide but that the bars 11 being spaced throughout their entire length, permit of the passage of the wire freely therebetween whether the post be a line post or a corner post.

What is claimed is:—

In a wire stretcher, a frame provided with an inwardly curved side and other sides projecting in the same direction from the inwardly curved side, said curved side being arranged to engage a fence post, an arm projecting from one end of said curved side, in a direction opposite said other sides, flanges having edges parallel to the last mentioned sides and adapted to engage against the side of said post, said arm being provided with an opening, an eyebolt passing through said opening a nut on said bolt between said flanges a hook bolt passing through the one of said second mentioned sides remote from said arm, a nut on the inner end of said hook bolt, and a chain carried by said eyebolt and adapted for detachable connection with said hook bolt: in combination with stretching means carried by said frame.

In testimony whereof I have signed my name to this specification in the presence of two subscribing witnesses.

SAMUEL L. RILEY.

Witnesses:
S. J. WILLIAMSON,
B. F. WHITE.